United States Patent Office 3,109,454
Patented Nov. 5, 1963

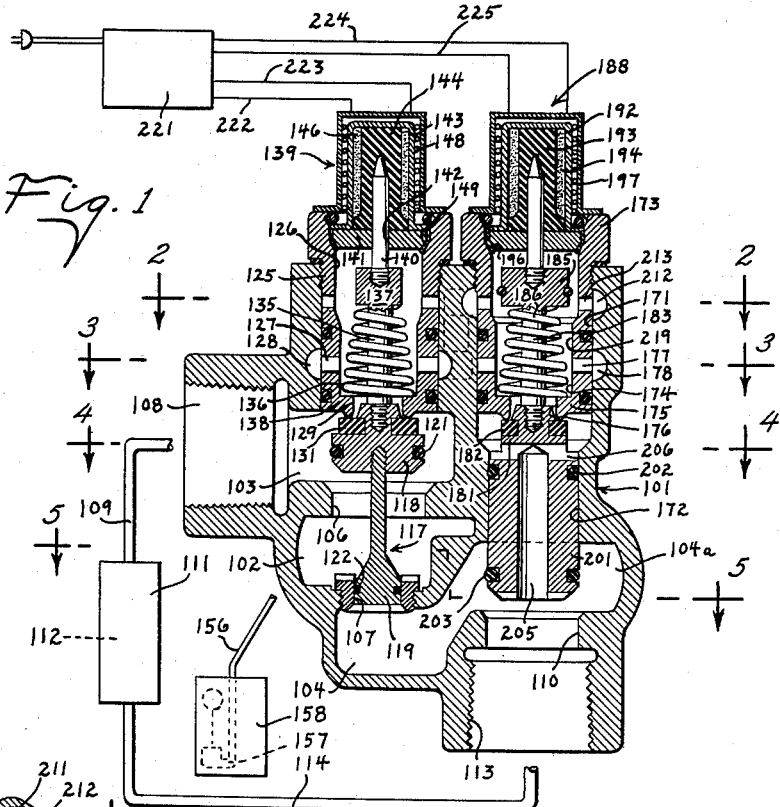
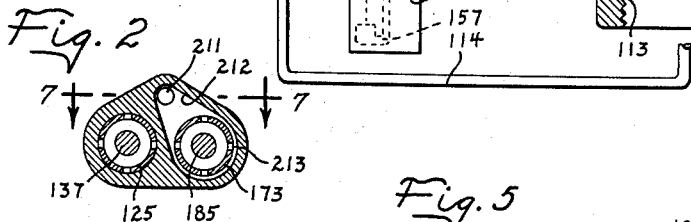
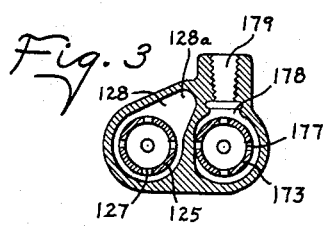
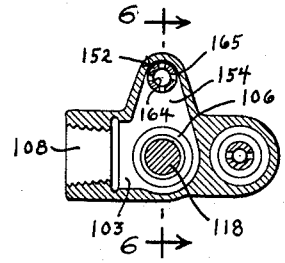
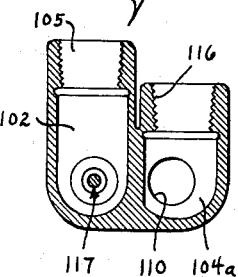
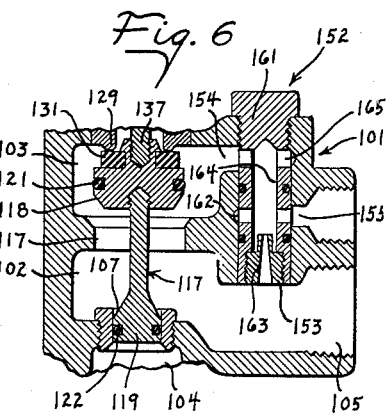
Inventors
Robert A. Whitlock
Thomas W. Johnson
By McCanna, Morsbach & Pillote
Atty's

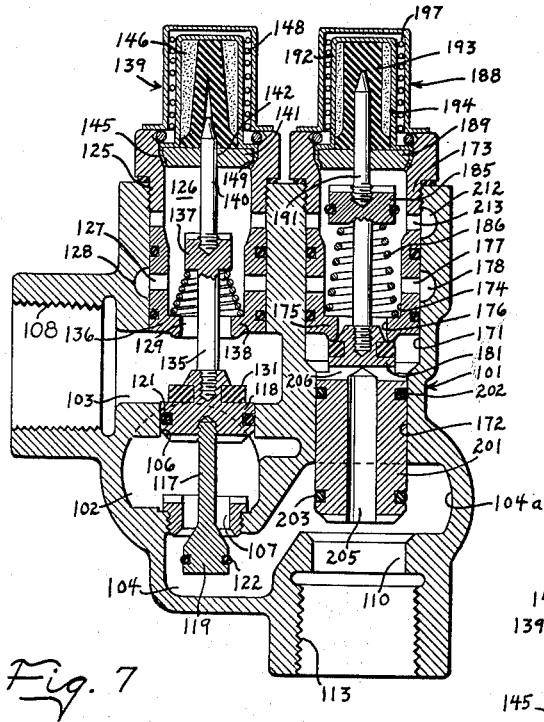

3,109,454
FLOW CONTROL APPARATUS
Robert A. Whitlock and Thomas W. Johnson, Rockford,
Ill., assignors to Aqua Matic Inc., Rockford, Ill., a corporation of Illinois
Filed May 13, 1960, Ser. No. 28,908
8 Claims. (Cl. 137—599.1)

This invention relates to improvements in flow control apparatus and particularly to an improved apparatus for controlling the various flows of fluid to and from a water treatment device.

Various important objects of this invention are to provide a control apparatus for a water treatment device which will reliably control the various flows of fluid to and from the water treatment device during a complete regeneration cycle; which is automatic in operation, and which can be easily and economically manufactured.

Another object of this invention is to provide a control apparatus for a water treatment device having an electrically energized heat motor to operate valve apparatus and which is so arranged that the flows of fluid through the valve are effective to cool the heat motor and prevent overheating of the latter.

Still another object of this invention is to provide a flow control apparatus employing a pair of heat motor operated drain valves so arranged that flow to drain from one heat motor is controlled by the other heat motor to thereby prevent flow to drain from more than one drain valve at a time.

Yet another object of this invention is to provide a flow control apparatus for a water treatment device which will effect a conventional cycle of downflow through the treatment device during service, upflow during backwash, and downflow during brining and slow rinsing of the bed, and which apparatus will also effect a rapid rinse of the bed of exchange material.

The invention also resides in the construction of the valve which facilitates assembly and disassembly of the valve.

These, together with various ancillary objects and advantages of this invention will be more readily appreciated as the same becomes better understood by reference to the following description when taken in connection with the accompanying drawings wherein:

FIGURE 1 is a longitudinal sectional view through a flow control apparatus illustrating the same in its regeneration position;

FIGURE 2 is a transverse sectional view taken on the plane 2—2 of FIG. 1;

FIGURE 3 is a transverse sectional view taken on the plane 3—3 of FIG. 1;

FIGURE 4 is a transverse sectional view taken on the plane 4—4 of FIG. 1;

FIGURE 5 is a transverse sectional view taken on the plane 5—5 of FIG. 1;

FIG. 6 is a fragmentary sectional view taken on the plane 6—6 of FIG. 4 and showing the ejector;

FIG. 7 is a fragmentary sectional view taken on the plane 7—7 of FIG. 2 and showing the backwash control;

FIG. 8 is a longitudinal sectional view through the control apparatus of FIG. 1 and illustrating the same in its backwash position, and FIG. 9 is a longitudinal sectional view through the control apparatus of FIG. 1 illustrating the position of the valve during the regenerant injection and slow rinse phases of the regenerant cycle.

In general, the flow control apparatus is arranged to provide a conventional cycle of downflow during service, upflow backwash, and downflow during brining and rinsing of the bed of exchange material, while employing two-position type valves. The flow control apparatus includes a casing 101 defining an inlet chamber 102 and spaced top and bottom outlet chambers 103 and 104. An inlet passage 105 (FIG. 5) communicates with the inlet chamber to supply raw water thereto and axially aligned ports 106 and 107 communicate the inlet chamber with the top and bottom chambers respectively. The upper flow chamber 103 has an upper outlet passage 108 communicating therewith and connected through a conduit 109 to the top of the treatment tank 111. The lower flow passage 104 is connected through a lower outlet passage 113 and a conduit 114 leading to the bottom of the treatment tank. As will be noted from FIGS. 1, 8 and 9, the lower flow passage has a laterally extending portion 104a and an auxiliary valve port 110 is formed in the casing between the lateral portion 104a of the lower flow passage and the outlet passage 113. A service outlet passage 116 communicates with the lower flow passage 104 and as shown in FIG. 5 extends from the laterally offset portion 104a to pass fluid to the service line (not shown).

A main valve member 117 is provided for controlling flow through the upper and lower ports 106 and 107 and has upper and lower valve elements 118 and 119 respectively cooperable with the upper and lower ports. The valve member 117 is preferably arranged to permit limited lost motion of the operator after the respective ports have been closed, and as herein shown the valve is of the sleeve type wherein the valve elements have gaskets 121 and 122 on their peripheries adapted to form a sliding seal with the respective ports.

A first drain valve for passing the backwash flow to drain, is provided at the upper end of the casing and, in the embodiment shown, a drain valve body 125 in the form of a sleeve insert is mounted in the upper end of the casing 101 and forms a part thereof. The drain valve body defines a drain chamber 126 and has a drain outlet port 127 formed therein and arranged for communication with a drain passage 128 in the valve body. An upper drain port 129 communicates the drain chamber with the upper outlet chamber 103 and has a seat therearound. A first drain valve member 131 controls flow through the drain port 127 and as shown is in the form of a resilient washer mounted on the upper face of the main valve member 117 for movement therewith. The drain valve member 131 and main valve member 117 are so arranged that the lower valve element 119 closes the lower port 107 when the drain valve member 131 is closed, as shown in FIG. 1, and the upper element 118 closes the upper port 106 when the drain valve member is opened as shown in FIGS. 8 and 9.

A stem 135 is provided for moving the drain valve and main valve members and the latter are yieldably urged to the position shown in FIG. 1 by a spring 136 interposed between a flange 137 on the stem and a flange 138 on the drain valve body. A heat motor 139 is mounted on the drain valve body for selectively moving the drain valve member 131 to its open position and the main valve member 117 to a position closing the port 106 and opening port 107, as shown in FIG. 8. The heat motor 139 comprises a base 141 having a guide bore 142 therein for slidably supporting an actuator 140. An expansion chamber including a rigid shell 143 and a resilient body 144 is mounted on the base. The shell has an integral flange 145 spun over the periphery of the base to secure the same together. The resilient body, formed of rubber or the like, is disposed in the shell 143 and spaced from the sides thereof to form an annular compartment therebetween. Thermally expansible material 146 is provided in the shell around the resilient body and, when the expansible material is heated, it expands and applies pressure on the resilient body to urge the actuator 140 in a direction outwardly of the chamber. A heater 148 is disposed around the shell for selectively heating the expansible material 146 to actuate the heat motor. In this form, the heat motor is also mounted on the casing means to be cooled thereby and by the liquid flowing through the casing and is preferably recessed as indicated at 149 in the valve body to increase the heat conduction between the shell and the casing.

An ejector 152 (FIG. 6) is arranged to introduce regenerant into the top of the treatment tank during the regeneration phase of the regeneration cycle and is conveniently formed on one side of the valve casing. The ejector has an inlet end 153 communicating with the raw water inlet chamber 102 and an outlet passage 154 which communicates with the top chamber 103. A brine inlet passage 155 is connected through a conduit 156 (FIG. 1) and regenerant control valve 157 to the regenerant tank 158. The regenerant control valve may be of any conventional construction such as the float valve diagrammatically illustrated and which operates to shut off the flow to the tank 158 when the liquid reaches a preselected upper level therein, and which shuts off the flow from the tank when the liquid reaches a preselected lower level. The ejector body is in the form of a plug 161 which is threaded into the boss on the side of the valve casing and has spaced O-rings which seal the plug to the boss at opposite sides of the regenerant inlet passage 155. The ejector body has a regenerant inlet port 162 therein which communicates with the brine inlet passage 155, and a nozzle 163 threaded thereinto and which directs water into the throat 164. Lateral outlet passages 165 communicate the throat with the outlet passage 154.

A second drain valve and an auxiliary valve are provided for controlling the flow of fluid from the bottom of the treatment tank to drain and are operated in conjunction with the main valve 117 and the first drain valve 131 to effect downflow of fluid through the treatment tank during the regeneration and rinse phases of the regeneration cycle. The second drain valve and auxiliary valve are mounted in a stepped bore in the casing 101 and which bore includes an enlarged upper section 171 and a reduced diameter lower section 172 each disposed in axial alignment with the auxiliary port 110. The drain valve includes a sleeve body 173 which is inserted in the upper bore section 171 and threadedly attached to the casing 101. The drain valve body defines a drain chamber 174 and has an inwardly extending flange 175 at its lower end forming a drain port 176. The drain chamber 174 communicates through ports 177 in the sleeve body with a drain passage 178 in the casing for passing fluid to drain through the drain outlet 179 (FIG. 3).

A second drain valve member 181 having a resilient sealing face 182 is provided for controlling flow through the drain port 176. A stem 183 is attached to the second drain valve and extends upwardly through the port 176. A third drain valve member 185 is formed on the upper end of the stem for a purpose to be described hereinafter, and a spring 186 is interposed between the third drain valve member and the flange 175 to yieldably urge the second drain valve member 181 to a position blocking flow through the port 176. A second heat motor 188 is provided for opening the drain valve. The second heat motor is constructed the same as is heat motor 139 and includes a base 189 which slidably supports an actuator 191, a rigid shell 192, a resilient body 193 and a thermally expansible material 194 between the shell and the body. The heat motor is mounted in a recess 196 in the upper end of the drain valve body, in heat conducting relation therewith to be cooled by the fluid flowing through the valve, and a heater 197 surrounds the shell for selectively heating the same. The actuator 191 is threadedly attached to the upper end of the stem 183 of the second drain valve to open the latter when the heat motor 188 is heated.

An auxiliary valve member 201 is slidably disposed in the lower section 172 of the stepped bore in the casing and has an O-ring 202 thereon forming a sliding seal therebetween. The auxiliary valve is connected to the second drain valve for movement therewith and is herein shown formed integrally with the second drain valve. The auxiliary valve has a second O-ring 203 on its lower end adapted to form a sliding seal with the auxiliary valve port 110 when the second drain valve is open, to block flow from the lower flow passage 104 to the lower end of the treatment tank, and to also block flow from the lower flow passage 104 to the second drain passage 178. The auxiliary valve also has a passage extending therethrough which includes an axial bore 205 and cross-bore 206 which permit flow from the lower conduit 114 and lower outlet passage 113 through the second drain port 176 to drain, when the second drain valve is open.

The third drain valve member 185 is arranged to cut off the flow to drain from the first drain valve, when the second drain valve is opened. As shown in FIG. 3, the first drain passage 128 has a rearwardly extending portion 128a which communicates with the lower end of a vertically extending bore 211 (FIG. 7). As best shown in FIG. 2, a cored passage 212 in the casing extends laterally of the bore 211 and around the second valve body and ports 213 are formed in the second valve body to communicate the passage 212 with the second drain chamber. A backwash flow restrictor 215 (FIG. 7) is threaded into the bore 211 and has an axial passage 216 and lateral passages 217 which control the flow of backwash fluid from the passage 128 to the passage 212. The size of the passages 217 are selected to give the desired backwash rate under the pressure conditions in a particular installation and different backwash control elements can be readily inserted for different installations.

The second sleeve body 173 of the second drain valve has a reduced diameter seat 219 formed between the ports 213 and the drain ports 177 and the third drain valve member 185 has an O-ring on its periphery adapted to form a sliding seal with the seat 219, when the second drain valve is opened, to thereby cut off the flow to drain from the first drain valve.

The flow control apparatus is also preferably automatically operated as by a timer 221 having a first control circuit including conductors 222 and 223 connected to the heater 148 of the first heat motor, and a second control circuit including conductors 224 and 225 connected to the heater 197 of the second heat motor. The timer is arranged to energize the first circuit and the heater 148 after a time interval corresponding to the normal service cycle. The heater 148, when energized, operates the heat motor 139 to move the upper drain valve 131 to its open position and to move the valve elements 118 and 119 to respectively close the upper port 106 and open the lower port 107. This reverses the flow to the treatment tank, the raw water from the inlet flowing through the lower port 107, lower flow passage 113 and conduit 114 to the bottom of the tank. The effluent from the top flows through conduit 109 and through the first drain port 129, drain passage 128, backwash flow restrictor 215, passage 212 into the drain chamber of the second drain valve and from thence to drain through drain passage 178. After the completion of the backwash phase of the regeneration cycle, the timer energizes the second circuit including conductors 224 and 225, while maintaining the first circuit energized to hold the valve 117 in the position shown in FIG. 8. Heating of the heater 197 on the second heat motor operates the same to open the second drain valve 181 and close the auxiliary port 110, and to also close the port 219. Closing of the drain seat 219 terminates flow to drain from the first drain valve. This reduces the pressure on the treatment tank so that water flows through the ejector 152 and draws brine from the tank 158. The mixture of water and brine is introduced into the upper chamber 103 of the main valve and flows through the conduit 109 to the treatment tank. The effluent from the tank flows through the conduit 114, outlet passage 113 through the passages 205 and 206 in the auxiliary valve 201 and through drain port 176 to the drain passage 178. After a preselected quantity of brine has been withdrawn, the flow control valve 157 terminates the flow of brine to the ejector so that the continued flow through the ejector produces a slow rinse of the bed of exchange material 112 in the treatment tank. At the completion of the slow rinse phase of the regeneration cycle, the timer 209 deenergizes the heater 148 of the first drain valve and the first drain valve and the main valve 117 return to the position shown in FIG. 1. This provides a rapid rinse of the bed in which water from the inlet 105 flows through top passage 108, conduit 109 to the top of the tank 111 and the effluent from the bottom of the tank flows through conduit 114, and through the passages 205 and 206 in the auxiliary valve to drain. At the completion of the rapid rinse phase of the regeneration cycle, the timer deenergizes the heater 197 of the second drain valve and the second drain valve and the auxiliary valve then return to the position shown in FIG. 1. If desired, the rapid rinse phase of the regeneration cycle can be omitted, by deenergizing the heater 197 of the second drain valve at the completion of the slow rinse phase of the cycle.

It will thus be noted that the heat motors in the embodiment of FIGS. 1–9 are mounted on the casing to be cooled thereby and by the liquid flowing through the valve casing. Moreover, the valve elements are arranged to permit overtravel when the latter are heated to prevent the build-up of excess pressures in the valves.

We claim:

1. A flow control apparatus comprising, casing means defining an inlet chamber and first and second outlet chambers, an inlet passage communicating with said inlet chamber and first and second outlet passages respectively communicating with said first and second outlet chambers, said casing means having axially aligned outlet ports communicating said inlet chamber with said first and second outlet chambers, a two-position main valve member movable from a position blocking flow through one of said outlet ports to a position blocking flow through the other of said outlet ports, said casing means having a first drain passage and a first drain port between said first outlet chamber and said first drain passage, a first drain valve member controlling flow through said first drain port, said casing means having an auxiliary valve port between said second outlet chamber and said second flow passage, said casing having a second drain passage and a second drain port between said second flow passage and said second drain passage, a second drain valve member movable from a position blocking flow through said second drain port to an open position, an auxiliary valve member connected to said second valve member for movement therewith to a position blocking flow through said auxiliary port when the second drain valve is open, a first heat motor mounted on said casing means and connected to said first drain valve member for selectively opening the same, and a second heat motor mounted on said casing means and connected to said second drain valve member for opening the same and for moving the auxiliary valve to a position blocking flow through said auxiliary port.

2. The combination of claim 1 including means responsive to opening of said second drain valve member for terminating flow to drain from said first drain passage.

3. The combination of claim 1 wherein said casing means includes an auxiliary drain inlet passage communicating with said first drain passage and an auxiliary drain port between said auxiliary drain inlet passage and said second drain passage, and means connected to said second drain valve member for movement therewith between a position opening said auxiliary drain port when said second drain valve member closes said second drain port and a position closing said auxiliary drain port when said second drain valve member opens said second drain port.

4. A flow control apparatus comprising, casing means defining an inlet chamber and first and second outlet chambers, an inlet passage communicating with said inlet chamber and first outlet passage communicating with said first outlet chamber, said casing means having axially aligned outlet ports communicating said inlet chamber with said first and second outlet chambers, a two-position main valve member movable from a position blocking flow through one of said outlet ports to a position blocking flow through the other of said outlet ports, said casing means having a first drain passage and a first drain port between said first outlet chamber and said first drain passage and aligned with said outlet ports, a first drain valve member for controlling flow through said first drain port, said casing means having a second outlet passage and an auxiliary port between said second outlet chamber and said second outlet passage, said casing having a second drain passage and a second drain port between said second outlet chamber and said second drain passage, said second drain port being aligned with said auxiliary port, a second drain valve member for controlling flow through said second drain port, an auxiliary valve member connected to said second drain valve member and movable therewith to a position blocking flow from the second outlet chamber through said auxiliary port when said second drain valve is open, first and second heat motors mounted on said casing means and connected to said first and second drain valve members, said heat motors each including an actuator, expansion chamber having a rigid shell, a thermally expansible material in the shell, and a resilient body for applying pressure to the actuator to move the same, a heater for each of said heat motors, and means for selectively energizing said heat motors to actuate said first and second drain valve members.

5. The combination of claim 4 wherein said auxiliary valve member has means for blocking flow from said second outlet chamber to said second drain chamber when said auxiliary valve is in a position blocking flow through said auxiliary port, and passage means extending through said auxiliary valve member for communicating said second outlet passage with said second drain port when said auxiliary valve blocks flow from the second chamber through said auxiliary port.

6. The combination of claim 5 including passage means in said casing communicating said first drain passage with said second drain passage, said casing means defining a valve seat in said last-mentioned passage means axially aligned with said second drain port, and means connected to said second drain valve member for blocking flow through said seat when said second drain valve is open to thereby prevent flow to drain from said first drain valve.

7. A flow control apparatus comprising, casing means defining an inlet chamber and first and second outlet chambers, an inlet passage communicating with said inlet chamber and first outlet passage communicating with said first outlet chamber, said casing means having axially aligned outlet ports communicating said inlet chamber with said first and second outlet chambers, a two-position main valve member movable from a position blocking flow through one of said outlet ports to a position blocking flow through the other of said outlet ports, said casing means having a first drain passage and a first drain port between said first outlet chamber and said first drain passage and aligned with said outlet ports, a first drain valve member for controlling flow through said first drain port, said second outlet passage having a portion extending laterally of the axis of said first and second outlet ports, a second outlet passage communicating with said laterally extending portion of the second outlet chamber, means on said casing means defining an auxiliary port between said second outlet chamber and said second outlet port, said auxiliary port having an axis disposed parallel to and laterally offset from the axis of said first and second outlet ports, said casing having a bore therein aligned with said auxiliary port and extending from the side of said offset portion of the second outlet chamber opposite said auxiliary port, an auxiliary valve member slidable in said bore to form a seal therewith in all operative positions of the auxiliary valve member and into and out of a position closing said auxiliary port, said casing means having a second drain passage therein and a second drain port intermediate said second drain passage and said bore, a second drain valve member connected to said auxiliary valve member for movement therewith between a closed position when the auxiliary port is open to an open position when the auxiliary valve member closes the auxiliary port, and passage means extending through said auxiliary valve member for passing fluid from the second outlet passage to the second drain passage when the second drain valve is open and the auxiliary valve port is closed, and first and second means connected to said first and second drain valve members for selectively operating the same.

8. The combination of claim 7 including passage means in said casing means communicating said first drain passage with said second drain passage, means defining a third drain seat in said passage, and a third drain valve member connected to said second drain valve member for movement therewith to a position blocking flow through said third seat when said second drain valve is open to thereby prevent flow from the first drain passage when the second drain port is open.

References Cited in the file of this patent

UNITED STATES PATENTS

| | | |
|---|---|---|
| 1,994,728 | Persons | Mar. 19, 1935 |
| 2,670,328 | Webb | Feb. 23, 1954 |
| 2,777,662 | Hansen | Jan. 15, 1957 |
| 2,928,233 | Kimm | Mar. 15, 1960 |
| 2,935,092 | Stoner | May 3, 1960 |